United States Patent
Batzer (10) Patent No.: US 12,231,843 B2
(45) Date of Patent: Feb. 18, 2025

(54) WIDEBAND DOA IMPROVEMENTS FOR FIXED AND DYNAMIC BEAMFORMERS

(71) Applicant: ClearOne, Inc., Salt Lake City, UT (US)

(72) Inventor: Trisha Batzer, North Salt Lake, UT (US)

(73) Assignee: ClearOne, Inc., Salt Lake City, UT (US)

( * ) Notice: Subject to any disclaimer, the term of this patent is extended or adjusted under 35 U.S.C. 154(b) by 75 days.

(21) Appl. No.: 17/819,093

(22) Filed: Aug. 11, 2022

(65) Prior Publication Data
US 2023/0050677 A1 Feb. 16, 2023

Related U.S. Application Data

(60) Provisional application No. 63/260,270, filed on Aug. 14, 2021.

(51) Int. Cl.
*H04R 1/40* (2006.01)
*H04R 3/00* (2006.01)

(52) U.S. Cl.
CPC ............. *H04R 1/406* (2013.01); *H04R 3/005* (2013.01); *H04R 2201/401* (2013.01)

(58) Field of Classification Search
CPC ...... H04R 1/406; H04R 3/005; H04R 29/005; H04R 2201/401; H04R 2430/21; H04R 2430/23
USPC .................................. 381/56, 58, 71.1, 91, 92
See application file for complete search history.

(56) References Cited

U.S. PATENT DOCUMENTS

| | | |
|---|---|---|
| 10,728,653 B2 | 7/2020 | Graham et al. |
| 11,297,420 B1 | 4/2022 | Graham et al. |
| 11,303,996 B1 | 4/2022 | Graham et al. |
| 2008/0068266 A1 | 3/2008 | DeAgro |
| 2013/0101073 A1 | 4/2013 | Zai et al. |
| 2015/0092890 A1 | 4/2015 | Richards |
| 2016/0013855 A1 | 1/2016 | Campos et al. |

(Continued)

FOREIGN PATENT DOCUMENTS

| | | |
|---|---|---|
| KR | 101678305 B1 * | 11/2016 |
| WO | 0016308 A1 | 3/2000 |
| WO | 2022219594 A1 | 10/2022 |

OTHER PUBLICATIONS

U.S. Appl. No. 63/174,884, titled: Wideband Beamforming with Interference Cancellation at Multiple Independent Frequencies and Spatial Locations, filed Apr. 14, 2021.

*Primary Examiner* — William A Jerez Lora
(74) *Attorney, Agent, or Firm* — Matthew J Booth PC; Matthew J. Booth (57) ABSTRACT

This disclosure describes an apparatus and method of an embodiment of an invention that is improves Direction of Arrival (DOA) determinations. This embodiment of the apparatus includes a plurality of microphones coupled together as a microphone array used for beamforming, the plurality of microphones are positioned at predetermined locations and produce audio signals to be used to form a directional pickup pattern; a processor, memory, storage, and a power supply operably coupled to the microphone array, the processor configured to execute the following steps: processing an algorithm for a Direction of Arrival (DOA) determination; supplemental processing that improves the DOA processing.

8 Claims, 8 Drawing Sheets

(56) References Cited

U.S. PATENT DOCUMENTS

| | | |
|---|---|---|
| 2016/0302006 A1 | 10/2016 | Pandey et al. |
| 2018/0330747 A1* | 11/2018 | Ebenezer ................ G10L 15/20 |
| 2020/0213728 A1* | 7/2020 | Lopatka ................ G01S 3/8083 |
| 2021/0125625 A1* | 4/2021 | Huang .................... G10L 25/21 |
| 2021/0149007 A1 | 5/2021 | Kovvali et al. |
| 2021/0223349 A1* | 7/2021 | Wei ........................ G01S 3/8038 |
| 2022/0417706 A1* | 12/2022 | Gummadi ............ H04B 7/0626 |
| 2023/0026735 A1* | 1/2023 | Montazeri ................ H04R 5/04 |

* cited by examiner

WIDEBAND DOA IMPROVEMENTS FOR FIXED AND DYNAMIC BEAMFORMERS

CROSS REFERENCE TO RELATED APPLICATIONS

This application claims priority and the benefits of the earlier filed Provisional Application USAN 63260270, filed Aug. 14, 2021, which is incorporated by reference for all purposes into this specification.

TECHNICAL FIELD

This disclosure relates to wideband beamforming. More specifically, this disclosure relates to wideband Direction-of-Arrival Improvements for fixed and dynamic Beamformers.

BACKGROUND ART

A beamforming microphone array comprises a plurality of microphones that picks up audio input signals and through delays and/or filters, forms a beam directivity pattern with focus in a spatial region and attenuation outside that region. A beamformer is a filter in space across a frequency range of interest, in other words, it acts as a filter in space and frequency. The beam forming for a group of microphones is done through signal processing methods such as delays and/or filters for the microphone signals. The microphone array has more than one microphone and typically includes enough microphones to form a beam directivity pattern that boosts signals within the main lobe half-power beamwidth, attenuates signals outside that beamwidth, and that covers the audio spectrum of interest.

The geometry of the array can be any physically realizable arrangement. The array geometry can be linear or 1 D, planar to 2D, and 3D shapes such as spheres, ellipsoids, or cylinders. Microphones are positioned at predetermined locations. A microphone element itself may be integrally omnidirectional, cardioid, cosine, or custom, where the most typical microphone element is omnidirectional. For sound signals to impinge on the microphones, an acoustically transparent outer surface is used or there are holes over the microphones. Depending on the geometry, the array can be installed on a table, wall, ceiling, or integrated into the ceiling tile or wall panel.

Signal processing is part of the beamforming microphone array for forming a beam, determining DOA, and steering a beam. Blocks, modules, and circuits may be implemented or performed with a general-purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

Beamforming arrays must be engineered, and microphones relatively positioned to support the frequency range of input signals and avoid aliasing.

The DOA determination can be achieved through a variety of signal processing computations, referred to as algorithms, where the signals from each microphone or subset of microphones are part of the algorithm. Regardless of the specifics of the DOA algorithm or choice of algorithm, embodiments in this disclosure improve the DOA determination by additional processing.

The current technology is described in these references:

PLT1: US Pub. No. 20210149007. Title: Beamformer Enhanced Direction of Arrival Estimation in A Reverberant Environment with Directional Noise. This disclosure describes an estimator of direction of arrival (DOA) of speech from a far-field talker to a device in the presence of room reverberation and directional noise includes audio inputs received from multiple microphones and one or more beamformer outputs generated by processing the microphone inputs. A first DOA estimate is obtained by performing generalized cross-correlation between two or more of the microphone inputs. A second DOA estimate is obtained by performing generalized cross-correlation between one of the one or more beamformer outputs and one or more of: the microphone inputs and other of the one or more beamformer outputs. A selector selects the first or second DOA estimate based on an SNR estimate at the microphone inputs and a noise reduction amount estimate at the beamformer outputs. The SNR and noise reduction estimates may be obtained based on the detection of a keyword spoken by a desired talker. In contrast, however, this invention augments the signal processing capability and provides improved fixed beam and dynamic beam steering over various participant(s). This reference is incorporated by reference for all purposes into this disclosure.

This application incorporates technology from other patents owned by the Applicant that include: USAN 15190414, titled: Conferencing Apparatus, filed Jun. 23, 2016; and USPN 10728653, titled: Ceiling Tile Microphone, filed Jul. 25, 2016; USAN 63174884, titled: Wideband Beamforming with Interference Cancellation at Multiple Independent Frequencies and Spatial Locations, filed Apr. 14, 2021; PCT/IB2022/053551, titled: Wideband Beamforming with Main Lobe Steering and Interference Cancellation at Multiple Independent Frequencies and Spatial Locations, filed Apr. 14, 2022; all of which are incorporated by reference for all purposes into this disclosure.

Technical Problem

Embodiments of this disclosure are for an audio-conferencing system comprising a beamforming microphone array that includes direction of arrival (DOA) determination with noise reduction. The purpose is to improve DOA location of participants and thus beam steering over the participant(s).

Solution to Problem

Embodiments of this disclosure use of (1) improved DOA determination in the presence of noise by scoring audio frequency bands' DOA content, (2) improved DOA determination by in-band noise suppression, noise cancellation, and/or second-order IIR separation of a narrowband time-varying signal from wideband speech, (3) improved DOA determination by de-noising with deep learning networks (DNN), machine learning (ML), or artificial intelligence (AI) library of in-band noises sources such as dog barks, or key strokes, (5) improved DOA determination using ultra-wideband (UWB) devices for spatial awareness, and (6) any combination of these items. The goal is better beam placement (or steering) over a room's participant(s) for either real-time dynamic beam steering or fixed beam steering, particularly with in-band noise that disrupts DOA location and beam placement.

Advantageous Effects of Invention

Embodiments of this disclosure relate to the beamformer products and augments the signal processing capability, and applications of the beamformers. It provides improved fixed beam and dynamic beam steering over participant(s).

No known microphone beamforming technology has used noise suppression, noise cancellation, second order IIRs, deep learning networks, machine learning, and/or artificial intelligence as individual pre-processing to improve DOA calculations, or a combination of these methods for conferencing systems with in-band noise. No known microphone beamforming technology has incorporated UWB devices for dynamic real-time or fixed beam steering with non-deterministic noise and moving noise sources, or even without in-band noise to just aid spatial location and speed. No known beamforming device uses a breakdown of filter bands and a scoring system of speech energy and/or intelligence content in pertinent bands to weight and tally the DOA for improved performance and accuracy.

SUMMARY OF INVENTION

This disclosure describes an apparatus and method of an embodiment of an invention that improves Direction of Arrival (DOA) determinations. This embodiment of the apparatus includes a plurality of microphones coupled together as a microphone array used for beamforming, the plurality of microphones are positioned at predetermined locations and produce audio signals to be used to form a directional pickup pattern; a processor, memory, storage, and a power supply operably coupled to the microphone array, the processor configured to execute the following steps: processing an algorithm for a Direction of Arrival (DOA) determination; supplemental processing that improves the DOA processing.

The above embodiment of the invention may include one or more of these additional embodiments that may be combined in all combinations with the above embodiment. One embodiment of the invention describes where supplemental processing includes de-noising the audio signal and further includes where de-noising the audio signal further includes using one or more of the following: (a) deep learning networks (DLN), (b) artificial intelligence (AI), or (c) machine learning (ML). One embodiment of the invention describes where supplemental processing includes frequency band scoring the audio signal. One embodiment of the invention describes where supplemental processing includes energy weighting the audio signal. One embodiment of the invention describes where supplemental processing includes (a) noise suppression, (b) noise cancellation of in-band noise, (c) second order IIR filter of the audio signal, or (d) deep learning networks (DLN), artificial intelligence (AI), or machine learning (ML). One embodiment of the invention describes where supplemental processing includes Ultra-Wide Band (UWB) processing the audio signal. One embodiment of the invention describes where supplemental processing includes one or more of the following to the audio signal: (a) de-noising, (b) frequency band scoring, (c) energy weighting, (d) noise suppression, noise cancellation of in-band noise, second order IIR filter, (e) deep learning networks (DLN), artificial intelligence (AI), or machine learning (ML), or (f) Ultra-Wide Band (UWB) processing.

The present disclosure further describes an apparatus and method of an embodiment of the invention as further described in this disclosure. Other and further aspects and features of the disclosure will be evident from reading the following detailed description of the embodiments, which should illustrate, not limit, the present disclosure.

BRIEF DESCRIPTION OF DRAWINGS

The drawings accompanying and forming part of this specification are included to depict certain aspects of the disclosure. A clearer impression of the disclosure, and of the components and operation of systems provided with the disclosure, will become more readily apparent by referring to the exemplary, and therefore non-limiting, embodiments illustrated in the drawings, where identical reference numerals designate the same components. Note that the features illustrated in the drawings are not necessarily drawn to scale. The following is a brief description of the accompanying drawings:

FIG. 1

FIG. 2

FIG. 3

FIG. 4

FIG. 5

FIG. 6

FIG. 7

FIG. 8

DESCRIPTION OF EMBODIMENTS

The disclosed embodiments should describe aspects of the disclosure in sufficient detail to enable a person of ordinary skill in the art to practice the invention. Other embodiments may be utilized, and changes may be made without departing from the disclosure. The following detailed description is not to be taken in a limiting sense, and the present invention is defined only by the included claims.

Specific implementations shown and described are only examples and should not be construed as the only way to implement or partition the present disclosure into functional elements unless specified otherwise in this disclosure. A person of ordinary skill in the art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Benefits, other advantages, and solutions to problems are shown and described with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In the following description, elements, circuits, functions, and devices may be shown in block diagram form in order not to obscure the present disclosure in unnecessary detail. And block definitions and partitioning of logic between various blocks are exemplary of a specific implementation. It will be readily apparent to a person of ordinary skill in the art that the present disclosure may be practiced by numerous other partitioning solutions. A person of ordinary skill in the art would understand that information and signals may be represented using any of a variety of technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, where the bus may have a variety of bit widths and the present disclosure may be implemented on any number of data signals including a single data signal.

The illustrative functional units include logical blocks, modules, circuits, and devices described in the embodiments disclosed in this disclosure to emphasize their implementation independence more particularly. The functional units may be implemented or performed with a general-purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described in this disclosure. A general-purpose processor may be a microprocessor, any conventional processor, controller, microcontroller, or state machine. A general-purpose processor may be considered a special purpose processor while the general-purpose processor is configured to fetch and execute instructions (e.g., software code) stored on a computer-readable medium such as any type of memory, storage, and/or storage devices. A processor may also be implemented as a combination of computing devices, such as a combination of a DSP and a microprocessor, a plurality of microprocessors, one or more microprocessors in conjunction with a DSP core, or any other such configuration.

In addition, the illustrative functional units described above may include software, programs, or algorithms such as computer readable instructions that may be described in terms of a process that may be depicted as a flowchart, a flow diagram, a structure diagram, or a block diagram. The process may describe operational acts as a sequential process, many acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors. The software may be distributed over several code segments, modules, among different programs, and across several memory devices. Similarly, operational data may be identified and illustrated in this disclosure within modules and may be embodied in any suitable form and organized within any suitable data structure. The operational data may be collected as a single data set or may be distributed over different locations including over different storage devices. Data stated in ranges include each and every value within that range.

Elements described in this disclosure may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most discussed. For example, where feasible elements in Drawing 1 are designated with a format of 1xx, where 1 indicates Drawing 1 and xx designates the unique element.

Any reference to an element in this disclosure using a designation such as "first," "second," and so forth does not limit the quantity or order of those elements, unless such limitation is explicitly stated. Rather, these designations may be used in this disclosure as a convenient method of distinguishing between two or more elements or instances of an element. A reference to a first and second element does not mean that only two elements may be employed or that the first element must precede the second element. In addition, unless stated otherwise, a set of elements may comprise one or more elements.

Reference throughout this specification to "one embodiment", "an embodiment" or similar language means that a particular feature, structure, or characteristic described in the embodiment is included in at least one embodiment of the present invention. Appearances of the phrases "one embodiment", "an embodiment" and similar language throughout this specification may, but do not necessarily, all refer to the same embodiment.

In the following detailed description, reference is made to the illustrations, which form a part of the present disclosure, and in which is shown, by way of illustration, specific embodiments in which the present disclosure may be practiced. These embodiments are described in sufficient detail to enable a person of ordinary skill in the art to practice the present disclosure. However, other embodiments may be utilized, and structural, logical, and electrical changes may be made without departing from the true scope of the present disclosure. The illustrations in this disclosure are not meant to be actual views of any particular device or system but are merely idealized representations employed to describe embodiments of the present disclosure. And the illustrations presented are not necessarily drawn to scale. And elements common between drawings may retain the same or have similar numerical designations.

It will also be appreciated that one or more of the elements depicted in the drawings or figures can also be implemented in a more separated or integrated manner, or even removed or rendered as inoperable in certain cases, as is useful in accordance with a particular application. Additionally, any signal arrows in the drawings or figures should be considered only as exemplary, and not limiting, unless otherwise specifically noted. The scope of the present disclosure should be determined by the following claims and their legal equivalents.

As used in this disclosure, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Furthermore, the term "or" as used in this disclosure is generally intended to mean "and/or" unless otherwise indicated. For example, a condition A or B is satisfied by any one of the following: A is true (or present) and B is false (or not present); A is false (or not present) and B is true (or present); and both A and B are true (or present). As used in this disclosure, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description in this disclosure, the meaning of "in" includes "in" and "on" unless the context clearly dictates otherwise.

To aid any Patent Office and any readers of any patent issued on this disclosure in interpreting the included claims, the Applicant(s) wish to note that they do not intend any of the appended claims or claim elements to invoke 35 U.S.C. 112(f) (previously 35 U.S.C. 112(6)) unless the words "means for" or "step for" are explicitly used in that claim. Additionally, if any elements are specifically recited in means-plus-function format, then those elements are intended to be construed to cover the corresponding structure, material, or acts described in this disclosure or additional equivalents in accordance with 35 U.S.C. 112(f) (previously 35 U.S.C. 112(6)).

Purpose of DOA Determination/Calculation

A Direction of Arrival (DOA) determination or calculation determines the spatial location of a signal impinging on the microphones. DOA is used to either point a beam to a desired signal location or exclude pointing to a location when unwanted audio or noise is the signal or determine the audio direction such that source identity may be processed to include or exclude the talker(s) and/or audio in that direction.

The types of DOA calculations, referred to as DOA algorithms, vary somewhat but essentially locate peak signal strength in a given direction. The concept of peak signal location has a long history where in WWII, antenna systems would receive signals, measure the power, and move the antenna around to isolate the peak power coordinates in space relative to the antenna platform and to track signal movement in real-time. This concept also applies to a beacon where space is searched until signal detection. Furthermore, regions in space can also be excluded from the search to avoid locking onto known noise sources and/or knowledge that the signal of interest cannot lie in an exclusion region. This obviously reduces the spatial search "time to acquire" and minimizes detection or tracking of false signals. These concepts are understood and practiced in prior art.

In conferencing spaces, signals include speech and audible noise such as fans, HVAC, slamming doors, keystrokes, dogs barking, or any noise that interferes with participants speech clarity. Noise can be short transient disruptions, or background noise such as a projector or highway rumble. Either type of noise can be mobile or at a static location. Embodiments of this disclosure address detecting the participant's speech signal in the presence of the noise to improve DOA location of the participant, and thus improve correct beam placement for either fixed beam or dynamic beam placement, and therefore enhance speech.

Spatial coordinates for 1D arrays are often called azimuth (AZ), since 1D arrays cannot resolve more than one dimension in space. With 2D arrays, coordinates are azimuth and elevation (AZ,EL), and there exists a mirror image solution on either side of the 2D plane. A 2D array can resolve only two dimensions in space. With 3D arrays, one unique AZ,EL point is the solution. An example is a sphere with a point is identified by latitude and longitude.

DOA algorithms that are used may include Bartlett, Multiple Signal Classification (MUSIC), Minimum Variance Distortionless Response (MVDR), Cross-correlation, or steered power search. One skilled in the art will understand that this invention is not about specific algorithms or specific algorithmic additive noise characteristics, but it incorporates noise suppression, noise cancellation, second order IIR filter, and/or deep learning networks, artificial intelligence, or machine learning to assist DOA algorithms, and embodiments of this disclosure illustrate a frequency partition and DOA scoring method to correctly locate the signal-of-interest. Lastly, an Ultra-Wideband chip can be integrated into the conference system for DOA determination through the chip's transmit/receive radio signal. It uses the same principles of a DOA algorithm for signals impinging on an array of pre-positioned microphones.

Improvement of DOA by Frequency Band Scoring or Denoising

One of the disclosures is a scoring of bands with signal-of-interest content. Speech ranges from 20 to slightly above 20,000 Hz, but most content resides around 2K Hz, 4K Hz, 1 KHz, and 500 Hz. Speech has most of its energy in specific frequency bands, or in other words, it has a distribution of energy and a power spectral density. It also has an intelligibility range, where speech above 400 Hz is still understandable, and speech between 1 KHz to 4 KHz is important for understandability.

For the DOA detection in the presence of audible noise, the scoring method first partitions the signal (speech and noise) into frequency bands from about 100 Hz to 8 KHz. The precise center frequency is not consequential. For example, bandpass filters at 125 Hz, 250 Hz, 500 Hz, 1000 Hz, 2000 Hz, 4000 Hz, and 8000 Hz. Another plausible partition is 100 Hz, 200, 400, 800, 1600, 3200, 6400 Hz as the bandpass centers.

To find the speech spatial position, the signal flows through the microphone array, filters, and then to a DOA algorithm. The DOA algorithm finds the coordinates for each band. A tally of coordinates in each band is taken, and the most common coordinate is the estimated correct position, so the beam can them be steered over that spatial point or that speech from that position may be included in or excluded from transmission.

One embodiment also includes an energy weighting, so that bands with more speech energy are weighted more than others, and it includes an intelligibility weighting so bands with typically a higher intelligible content count more than others. Another way to realize the latter, is to adjust the bandwidths to focus on bands with higher intelligible speech content. Either weighting, neither weighting, or both weightings can be incorporated into the tally decision. This method of tallying the DOA estimations allows for in-band noise to be present and restricts the DOA from false locations due to non-speech disturbances.

For cases when the unwanted noise is speech from say a loudspeaker and not a desired participant, that loudspeaker location can be excluded from the DOA algorithm space.

Embodiments of this invention disclose an improved DOA determination by noise suppression and noise cancellation of in-band noise. By reducing the noise first, the DOA determination/estimate is enhanced. The speech plus noise signal is picked up by the microphone array. Prior to the DOA calculation, the signal is fed into a (1) noise suppression algorithm or (2) noise cancellation algorithm and/or a (3) second order IIR that eliminates sounds such as a siren passing by the room. Item 3 allows for the beams to not falsely track a fire siren, for instance passing by the meeting room, since a DOA calculation would detect the loud disturbance. This is especially important in dynamic beamforming systems where the beam is continually re-positioned to follow a participant's speech and it is important to not drift away from the intended talker. In addition, it applies to systems that are not real-time dynamic fixed setup or configuration. As for noise suppression, that can significantly minimize loud noises that are ever present in the audio range such as projectors, fans, and hallway noise. Noise cancellation reduces a source noise from detection through closed loop processing. Any of these methods support correct DOA estimation of the participant. One skilled in the art will appreciate that the specific noise suppression, noise cancellation, or second order IIR is not the main focus of the disclosed invention, but the inclusion of them is for improving the DOA determination. Processing for the microphone array, filters, noise algorithms, second order IIR, DOA algorithm, and beam steering uses state of the art signal processing and computer processing. As mentioned, logical blocks, modules, and circuits may be implemented with a general-purpose processor, a special purpose processor, a Digital Signal Processor (DSP), and ASIC, FPGA, or other programmable logic, discrete gate or transistor logic, discrete hardware components, or combinations.

Figure 1:
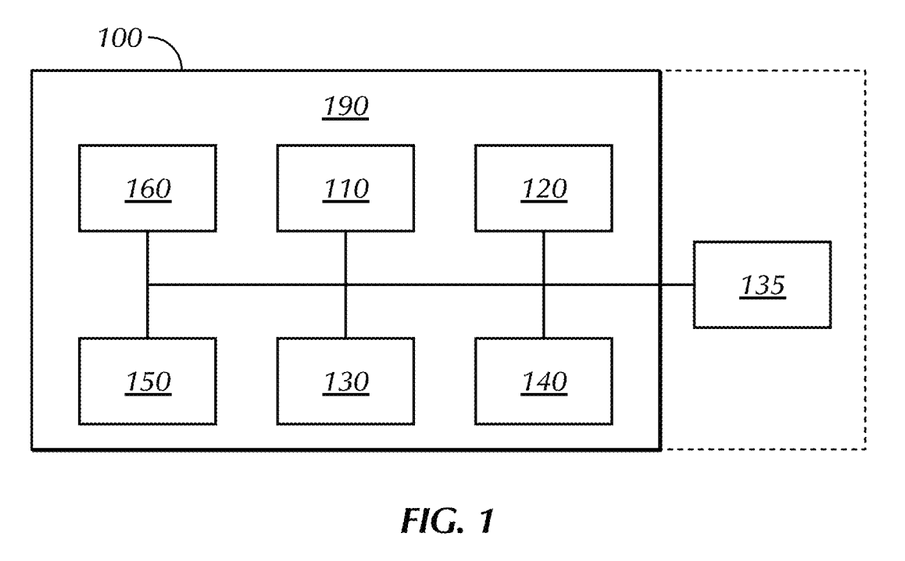
FIG. 1 are a block diagrams illustrating a conferencing apparatus according to several embodiments of the present invention.

FIG. 1 illustrates a conferencing apparatus 100 for one embodiment of the present disclosure. The conferencing apparatus 100 may include elements for executing software applications as part of embodiments of the present disclosure. Thus, the system 100 is configured for executing software programs containing computing instructions and includes one or more processors 110, memory 120, one or more communication elements 150, a power supply 160, user interface elements 130, and a beamforming microphone array (BMA) 135. The system 100 may also include storage 140. The conferencing apparatus 100 may be included in a housing 190. Other embodiments of the conferencing apparatus can include having the various components in one or more housings connected by communication elements as described below.

The processor 110 may be configured to execute a wide variety of applications including the computing instructions to carry out embodiments of the present disclosure.

The memory 120 may be used to hold computing instructions, data, and other information for performing a wide variety of tasks including performing embodiments of the present disclosure. By way of example, and not limitation, the memory 120 may include Static Random Access Memory (SRAM), Dynamic RAM (DRAM), Read-Only Memory (ROM), Flash memory, and the like.

Information related to the system 100 may be presented to, and received from, a user with one or more user interface elements 130. As non-limiting examples, the user interface elements 130 may include elements such as LED status indicators, displays, keyboards, mice, joysticks, haptic devices, microphones, speakers, cameras, and touchscreens.

The communication elements 150 may be configured for communicating with other devices and or communication networks. As non-limiting examples, the communication elements 150 may include elements for communicating on wired and wireless communication media, such as for example, serial ports, parallel ports, Ethernet connections, universal serial bus (USB) connections IEEE 1394 ("Firewire") connections, Bluetooth wireless connections, 802.1 a/b/g/n type wireless connections, and other suitable communication interfaces and protocols.

The storage 140 may be used for storing relatively large amounts of non-volatile information for use in the computing system 100 and may be configured as one or more storage devices. By way of example, and not limitation, these storage devices may include computer-readable media (CRM). This CRM may include, but is not limited to, magnetic and optical storage devices such as disk drives, magnetic tapes, CDs (compact disks), DVDs (digital versatile discs or digital video discs), semiconductor devices such as USB Drives, SD cards, ROM, EPROM, Flash Memory, other types of memory sticks, and other equivalent storage devices.

Software processes illustrated in this disclosure are intended to illustrate representative processes that may be performed by the systems illustrated herein. Unless specified otherwise, the order in which the process steps are described is not intended to be construed as a limitation, and steps described as occurring sequentially may occur in a different sequence, or in one or more parallel process streams. It will be appreciated by those of ordinary skill in the art that many steps and processes may occur in addition to those outlined in flow charts or drawings illustrating signal flow. Furthermore, the processes may be implemented in any suitable hardware, software, firmware, or combinations. When executed as firmware or software, the instructions for performing the processes may be stored on a computer-readable medium.

By way of non-limiting example, computing instructions for performing the processes may be stored on the storage 140, transferred to the memory 120 for execution, and executed by the processors 110. The processor 110, when executing computing instructions configured for performing the processes, constitutes structure for performing the processes and can be considered a special-purpose computer when so configured. In addition, some or all portions of the processes may be performed by hardware specifically configured for carrying out the processes.

One particular type of user interface element 130 used in embodiments of the present disclosure is a beamforming microphone array (BMA) 135 that comprises a plurality of microphones.

Directional microphones are often used in a conference to capture participant's audio. In a conference, microphones are usually placed on a table or hung from the ceiling and are manually positioned so that a participant's audio is in the pick-up pattern of the microphone. Since, the pick-up patterns of these microphones are fixed, more often than not one type of microphone, say a tabletop microphone, may not work for another type of installation, say a ceiling installation. Thus, an installer may need to know the type of installation (e.g., tabletop or ceiling), the angle of participants relative to the microphones, and the number of participants before installing a correct set of microphones. One skilled in the art will appreciate that the disclosed invention is applicable to a variety of microphones including various directional microphones, omnidirectional microphones, and other types of microphones. One embodiment of the disclosed invention uses omnidirectional microphones.

Directional microphones may be used in conferencing applications to perform spatial filtering to improve audio quality. These microphones have a beam pattern that selectively picks up acoustic waves in a region of space and rejects others.

In some embodiments of the present disclosure, the conferencing apparatus 100 uses a BMA 135 that can be installed in a number of positions and configurations, and beams for the microphones can be adjusted with base level configurations or automatically bring participants into the pick-up pattern of the beamforming microphone array 135 based on the orientation and placement of the conferencing apparatus 100.

The conferencing apparatus 100 illustrates that the BMA 135 can be located inside or outside of the housing 190. In the outside embodiment, the BMA 135 can be located further away from the main processing elements of the housing 190 and connect to those elements by way of the communication elements 150 that could include for example a USB connection, a Dante connection, or an ethernet connection. In outside embodiment, the BMA 135 may further include its own processor, memory, and storage that is separate from the main conferencing apparatus in housing 190.

Figure 2:
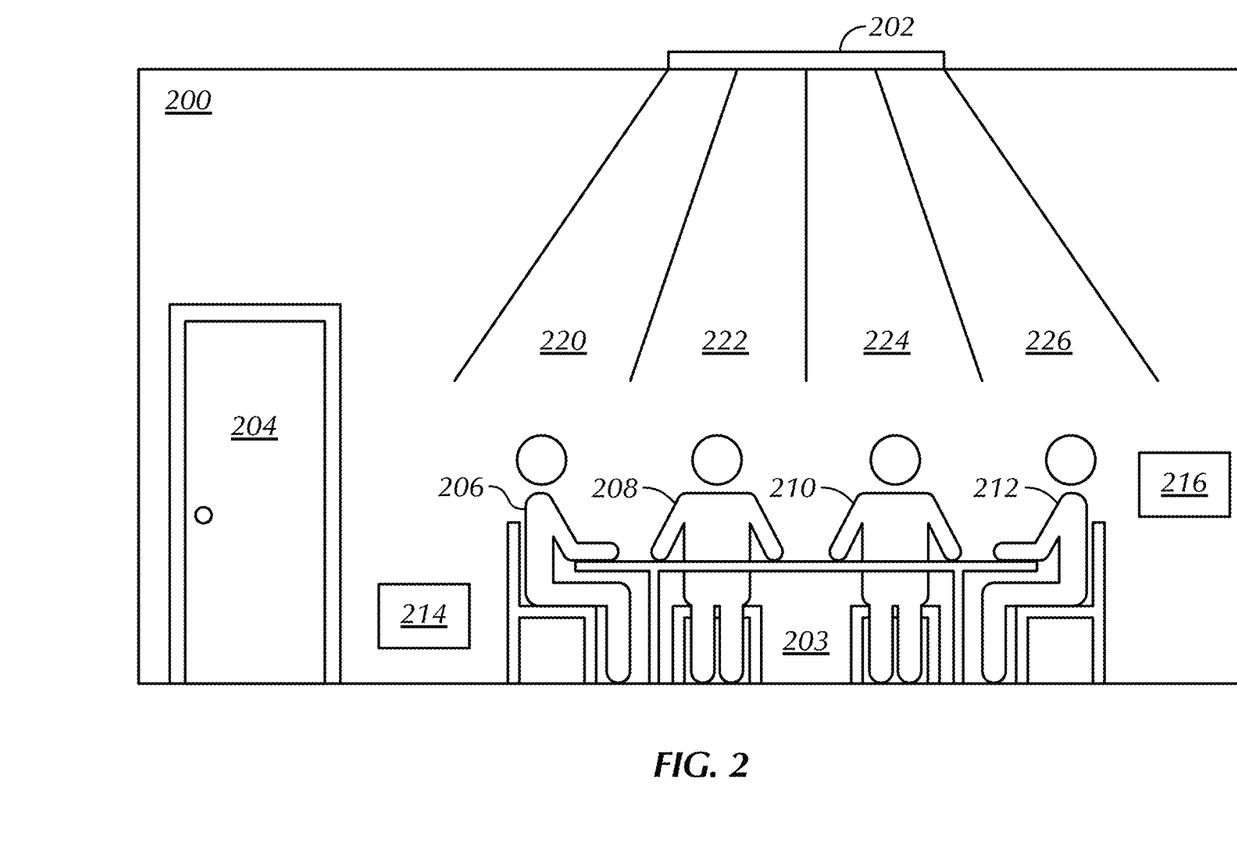
FIG. 2 discloses a microphone beamforming array embodiment of the disclosure used in conferencing environments.

FIG. 2 discloses a microphone beamforming array embodiment of the disclosure used in conferencing environments such as a conference room 200 with door 204. The microphone beamforming array 202 is a ceiling tile microphone array or is a microphone array attached to a ceiling that generates beam patterns at 220, 222, 224, 226. The conference room environment has one or more users 206, 208, 210, 212 attending the conference centered around table 203. The room 200 has one or more noise generators 214, 216 that need to be removed from the signal before further transmission. The noise generators can include faulty electrical equipment, coffee maker, small refrigerator, or any other such device that creates a signal that can be considered noise to be removed from the output signal. The microphone beamforming array 202 using the embodiments in this disclosure that improves the Direction of Arrival (DOA) determinations to cancel out the interference from the noise generators 214, 216 or a dead zone such as door 204 to produce an output signal that does not contain the noise or dead zone.

Figure 3:
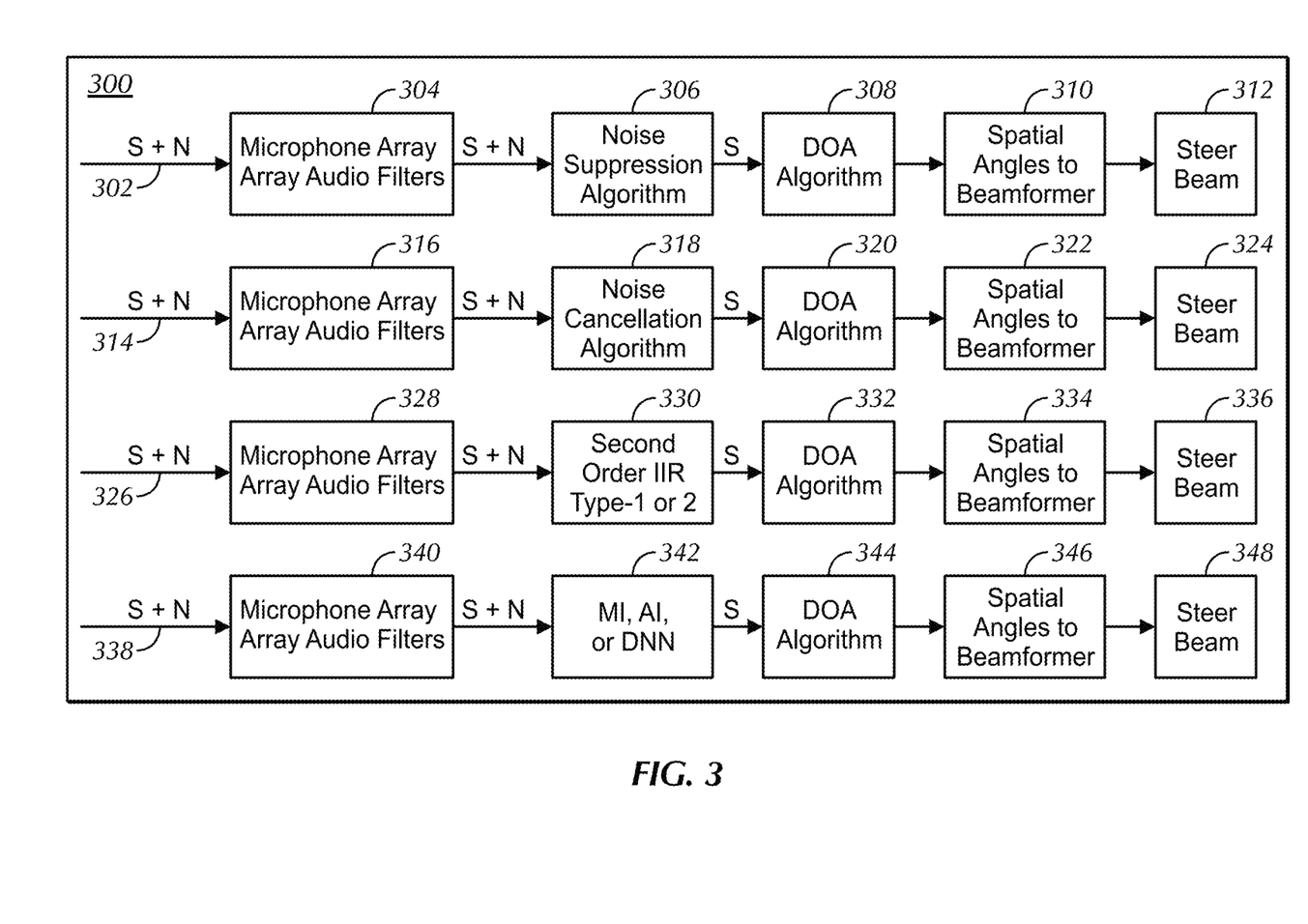
FIG. 3 illustrates a diagram of block processing to improve DOA estimation and steer a beamformer.

FIG. 3 illustrates a block diagram 300 of different processing techniques to improve the DOA estimation and correctly steer a beamformer according to multiple embodiments of the present disclosure. These techniques include: (1) improved DOA determination in the presence of noise by scoring audio frequency bands' DOA content, (2) improved DOA determination by in-band noise suppression, noise cancellation, and/or second-order IIR separation of a narrowband time-varying signal from wideband speech, (3) improved DOA determination by de-noising with deep learning networks (DNN), machine learning (ML), or artificial intelligence (AI) library of in-band noises sources such as dog barks, or key strokes, (5) improved DOA determination using ultra-wideband (UWB) devices for spatial awareness, and (6) any combination of these items. The goal is better beam placement (or steering) over a room's participant(s) for either real-time dynamic beam steering or fixed beam steering, particularly with in-band noise that disrupts DOA location and beam placement. With the second order IIR block, it can be applied either before or after noise suppression or noise cancellation and thus combine two methods of noise mitigation.

One embodiment includes a Noise Suppression Algorithm. An audio signal with Signal (S) and Noise (N) (S+N) 302 is received by the Array Audio Filters of the Microphone Array 304. The Noise Suppression Algorithm 306 receives the Signal (S) and Noise (S) and removes the Noise (N) from the Signal (S). The DOA algorithm 308 makes a DOA determination/estimate for the spatial location of a signal impinging on the microphones and sends the information of the Spatial Angles to the Beamformer 310 which then steers the pickup Beam 312.

Another embodiment includes a Noise Cancellation Algorithm. An audio signal with Signal (S) and Noise (N) (S+N) 314 is received by the Array Audio Filters of the Microphone Array 316. The Noise Suppression Algorithm 318 receives the Signal (S) and Noise (S) and removes the Noise (N) from the Signal (S). The DOA algorithm 320 makes a DOA determination/estimate for the spatial location of a signal impinging on the microphones and sends the information of the Spatial Angles to the Beamformer 322 which then steers the pickup Beam 324.

Another embodiment includes a Noise Cancellation Algorithm. An audio signal with Signal (S) and Noise (N) (S+N) 326 is received by the Array Audio Filters of the Microphone Array 328. The Noise Suppression Algorithm 330 receives the Signal (S) and Noise (S) and removes the Noise (N) from the Signal (S). The DOA algorithm 332 makes a DOA determination/estimate for the spatial location of a signal impinging on the microphones and sends the information of the Spatial Angles to the Beamformer 334 which then steers the pickup Beam 336.

Another embodiment includes a Noise Cancellation Algorithm. An audio signal with Signal (S) and Noise (N) (S+N) 338 is received by the Array Audio Filters of the Microphone Array 340. The Noise Suppression Algorithm 342 receives the Signal (S) and Noise (S) and removes the Noise (N) from the Signal (S). The DOA algorithm 344 makes a DOA determination/estimate for the spatial location of a signal impinging on the microphones and sends the information of the Spatial Angles to the Beamformer 346 which then steers the pickup Beam 348.

Figure 4:
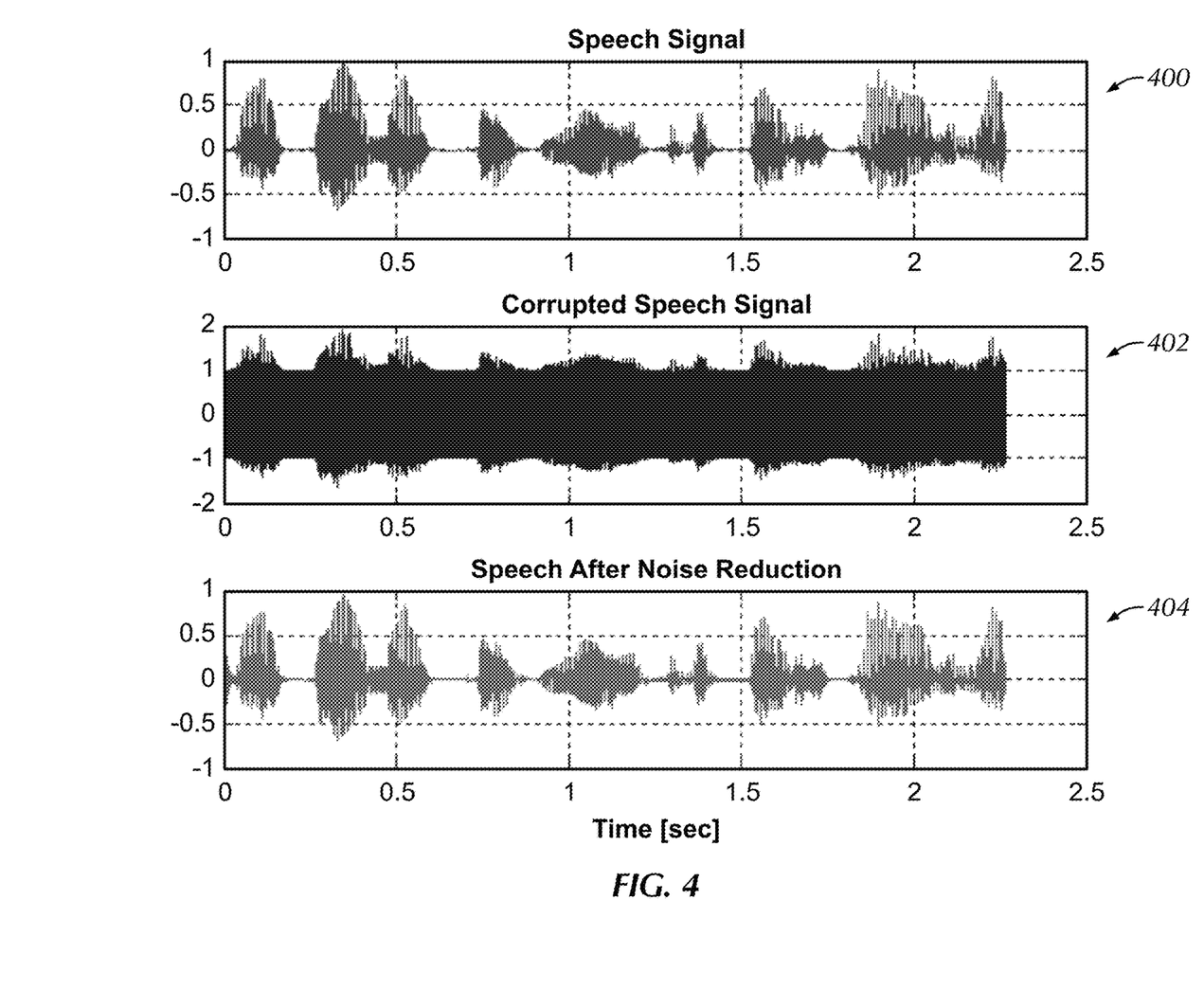
FIG. 4 illustrates speech segments for (a) clean speech (b) speech plus noise (c) speech after noise reduction.

FIG. 4 illustrates the noise mitigation of corrupted speech visually with colored graphs that show clean speech segments 400, speech and noise 402, and speech after noise reduction. The spectrogram of uncorrupted speech, and speech after noise reduction show the effectiveness of noise suppression or noise cancellation methods using various embodiments of the present disclosure. The color in this figure has no value or specific meaning, rather it helps illustrate the noise mitigation.

Figure 5:
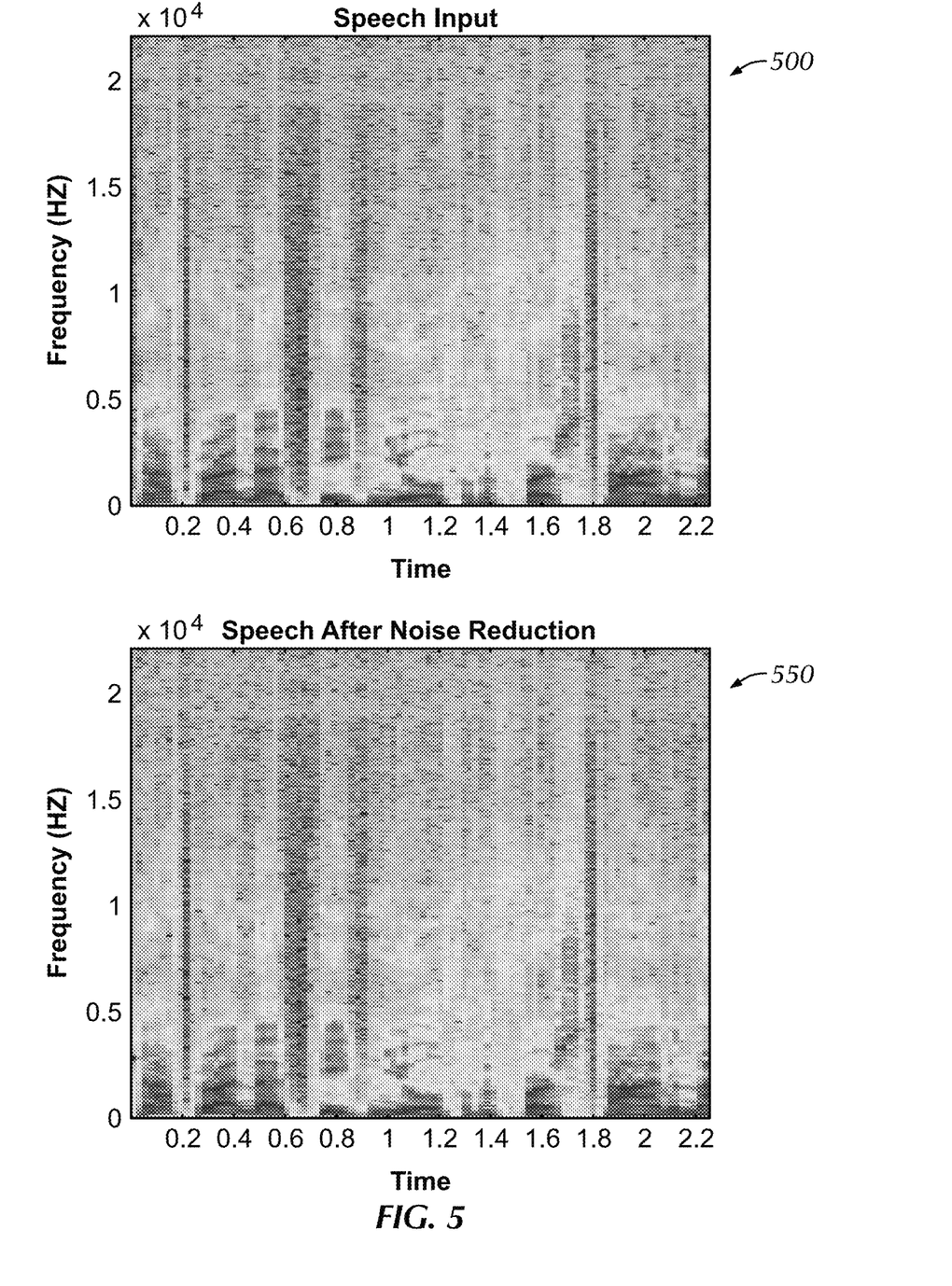
FIG. 5 illustrates spectrogram of speech for (a) clean speech (b) speech after noise reduction.

FIG. 5 is another illustration like [FIG. 4] that shows the noise mitigation of the present disclosure that shows the original speech 500 versus the corrected speech 550. The spectrogram of uncorrupted original speech 500 is very close to the spectrogram of the noise-mitigated speech 550. This illustrates that the noise mitigation of the present disclosure is good and that the original speech 500 is basically the same as the corrected speech 550.

DOA estimation is also improved by de-noising speech using deep learning networks (DLN), artificial intelligence (AI), or machine learning (ML). These are just de-noising methods in a class by themselves and are not called noise suppression, noise cancellation, or second order IIR filters. DLN use Short-time Fourier transforms (STFT) of clean audio and STFT of noisy audio as inputs into a DLN. The network uses the noisy input to minimize the mean squared error between its output clean audio. The de-noised output undergoes an inverse STFT into the time domain. AI is a general term that encompasses ML and refers to analyzing data and putting in into context, so a computer performs an action or provides information. ML develops algorithmic models that identify features of the speech or noise with data training, where the model learns speech and noise features from the lots of data in order to correctly categorize new data. It is a type of pattern recognition using data training.

The de-noised speech can then be sent to the DOA algorithm to determine the spatial location of the target participant.

Improvement of Real-time Dynamic Beam Steering with Ultra-Wideband Chips

One of the challenges of real-time beam steering is identifying the correct signal when in-band noise is non-deterministic and/or moving. One embodiment of the present disclosure addresses these environments using Ultra-wideband (UWB) chips that can Transmit (TX) and Receive (RX) signals in the radio spectrum. UWB uses low energy, short-range radio signals for wireless tracking. A UWB can be coupled to or integrated with the communication elements 150 of [FIG. 1]. Since both TX and RX are available in the chip, the participant wears the chip in a protective housing, and the beamformer houses two to three chips. One embodiment of the present disclosure incorporates the chips for dynamic real-time beamformer steering, which can significantly aid conferencing in noisy environments for correct, fast beam placement and thus better speech clarity.

Figure 6:
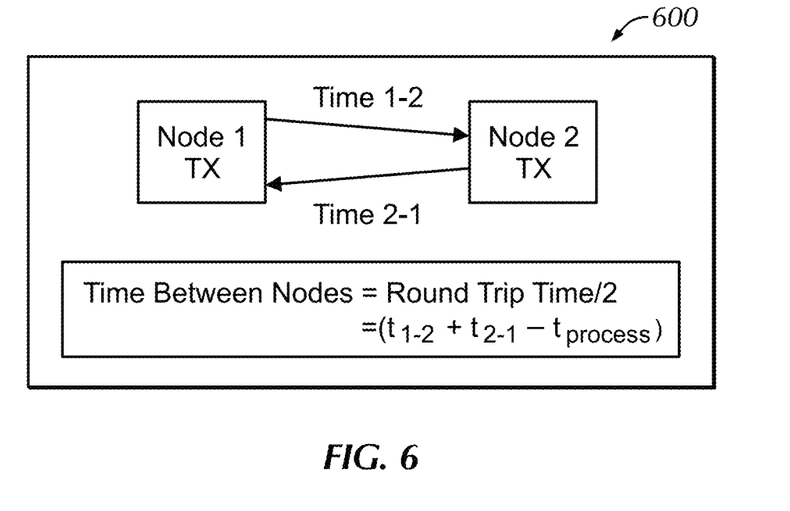
FIG. 6 illustrates the Time between TX and RX Nodes 1 and 2.

FIG. 6 illustrates the Time between TX and RX Nodes 1 and 2. To help illustrate the principle of using a UWB, a review of the basics in the UWB chip technology is presented. Distance between the TX and RX nodes is found using the round-trip time between nodes divided by 2. Node 1 sends a signal to Node 2; Node 2 receives the signal and sends a signal back to Node 1. Obviously, the time between nodes is the total trip time minus the processing time (tprocess) divided by 2. This computation is standard in communications systems and has long been used. Since velocity equals distance/time (v=D/t), the distance D is found from the speed of the signal v and time between nodes.

To compute the spatial location of a participant relative to the beamformer, two chips are incorporated into the circuitry of the beamformer.

Figure 7:
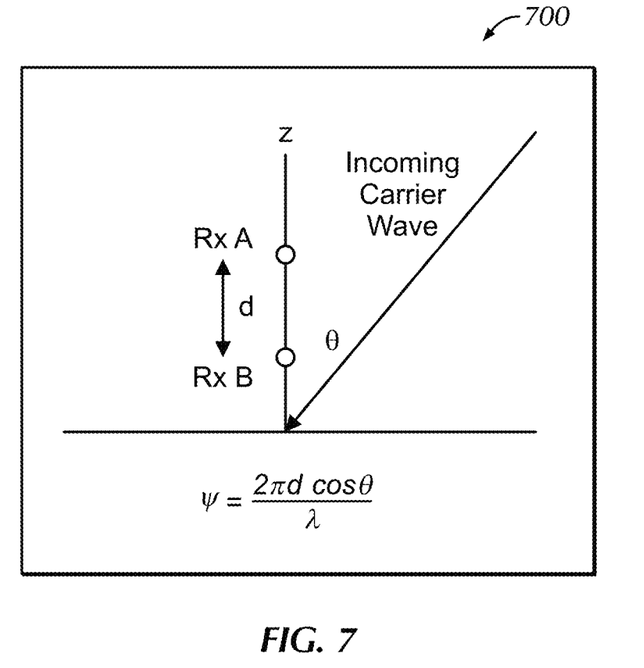
FIG. 7 illustrates (a) 1D Coordinate Frame for Incoming TX signal and RX Node A and B; and (b) Phase Difference of Incoming Signal between Node A and B.

FIG. 7 illustrates 700 (a) 1D Coordinate Frame for Incoming TX signal and RX Node A and B; and (b) Phase Difference of Incoming signal between Node A and B. Using basic principles of phase difference of arrival between the two RX nodes ip, the spatial location 8 of the TX relative to the RX nodes A and B can be found. The distance d between RX points follows the principle: $d<\lambda/2$, where $\lambda$ is the wavelength of the carrier wave. The phase difference is shown in the equation in the figure.

Figure 8:
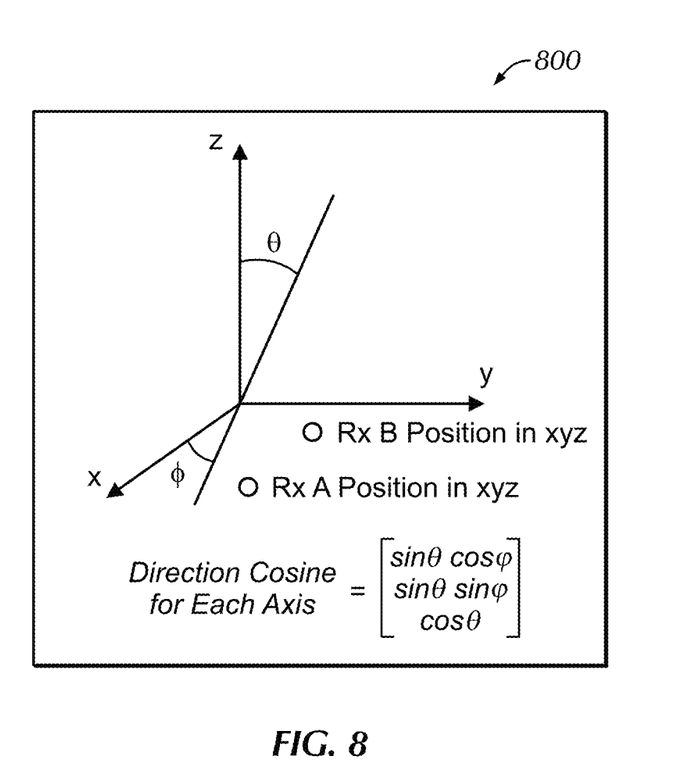
FIG. 8 illustrates (a) Coordinate Frame for Incoming TX signal and RX Node A and B; (b) Direction Cosine Matrix for Phase Computation.

FIG. 8 illustrates 800 (a) Coordinate Frame for Incoming TX signal and RX Node A and B; (b) Direction Cosine Matrix for Phase Computation. For a 2D or 3D array, the spatial coordinates are azimuth $\varphi$ and elevation 8 in the following coordinate frame. Phase becomes $2\pi/\lambda$*dot product of direction cosine matrix with the nodes' xyz delta position. Equivalently, the phase of each node is found using the dot product with position.

An embodiment of the present disclosure applies the UWB device to improve real-time dynamic beamformer steering not only in the presence of noise but also without significant noise. The carrier wave is not in the audio spectrum and is very fast relative to audio waves so dynamic tracking becomes much faster. The embodiment uses the available chip technology to better position the beam for a dynamic real-time beamformer and for a fixed beam as well. For multiple talkers, the UWB device applies when the participants each wear the device. One or more beams from the beamformer can be used.

While the present disclosure has been described in this disclosure regarding certain illustrated and described embodiments, those of ordinary skill in the art will recognize and appreciate that the present disclosure is not so limited. Rather, many additions, deletions, and modifications to the illustrated and described embodiments may be made without departing from the true scope of the invention, its spirit, or its essential characteristics as claimed along with their legal equivalents. In addition, features from one embodiment may be combined with features of another embodiment while still being encompassed within the scope of the invention as contemplated by the inventor. The described embodiments are to be considered only as illustrative and not restrictive. All changes which come within the meaning and range of equivalency of the claims are to be embraced within their scope. Disclosing the present invention is exemplary only, with the true scope of the present invention being determined by the included claims.

The invention claimed is:

1. An apparatus that improves Direction of Arrival (DOA) determinations, comprising:
   a plurality of microphones coupled together as a microphone array used for beamforming, the plurality of microphones are positioned at predetermined locations and produce audio signals to be used to form a directional pickup pattern;
   a processor, memory, storage, and a power supply operably coupled to the microphone array, the processor configured to execute the following steps:
   processing an algorithm for a Direction of Arrival (DOA) determination;
   supplemental processing that improves the DOA processing that includes:
      de-noising the audio signal that further includes using one or more of the following: (a) deep learning networks (DLN), (b) artificial intelligence (AI), or (c) machine learning (ML):
      Ultra-Wide Band (UWB) processing the audio signal;
      one or more of the following: frequency band scoring the audio signal or energy weighting the audio signal;
      one or more of the following: (a) noise suppression, (b) noise cancellation of in-band noise, or (c) second order IIR filter of the audio signal.

2. The Claim of claim 1 where a known and unwanted noise source is excluded from the DOA determination.

3. A method to make an apparatus that improves Direction of Arrival (DOA) determinations, comprising:
   coupling a plurality of microphones together as a microphone array used for beamforming, the plurality of microphones are positioned at predetermined locations and produce audio signals to be used to form a directional pickup pattern;
   operably coupling a processor, memory, storage, and a power supply to the microphone array, the processor configured to execute the following steps:
   processing an algorithm for a Direction of Arrival (DOA) determination;
   supplemental processing that improves the DOA processing that includes:

de-noising the audio signal that further includes using one or more of the following: (a) deep learning networks (DLN), (b) artificial intelligence (AI), or (c) machine learning (ML);

Ultra-Wide Band (UWB) processing the audio signal:

one or more of the following: frequency band scoring the audio signal or energy weighting the audio signal;

one or more of the following: (a) noise suppression, (b) noise cancellation of in-band noise, or (c) second order IIR filter of the audio signal.

4. The Claim of claim 3 where a known and unwanted noise source is excluded from the DOA determination.

5. A method to use an apparatus that improves Direction of Arrival (DOA) determinations, comprising:

beamforming using a plurality of microphones coupled together as a microphone array, the plurality of microphones are positioned at predetermined locations and produce audio signals to be used to form a directional pickup pattern;

providing a processor, memory, storage, and a power supply operably coupled to the microphone array, the processor configured to execute the following steps:

processing an algorithm for a Direction of Arrival (DOA) determination;

supplemental processing that improves the DOA processing that Includes:

de-noising the audio signal that further includes using one or more of the following: (a) deep learning networks (DLN), (b) artificial intelligence (AI), or (c) machine learning (ML);

Ultra-Wide Band (UWB) processing the audio signal:

one or more of the following, frequency band scoring the audio signal or energy weighting the audio signal;

one or more of the following: (a) noise suppression, (b) noise cancellation of in-band noise, or (c) second order IIR filter of the audio signal.

6. The Claim of claim 5 where a known and unwanted noise source is excluded from the DOA determination.

7. A non-transitory program storage device readable by a computing device that tangibly embodies a program of instructions executable by the computing device to perform a method to use an apparatus that improves Direction of Arrival (DOA) determinations, comprising:

beamforming using a plurality of microphones coupled together as a microphone array, the plurality of microphones are positioned at predetermined locations and produce audio signals to be used to form a directional pickup pattern;

providing a processor, memory, storage, and a power supply operably coupled to the microphone array, the processor configured to execute the following steps:

processing an algorithm for a Direction of Arrival (DOA) determination;

supplemental processing that improves the DOA processing that includes:

de-noising the audio signal that further includes using one or more of the following: (a) deep learning networks (DLN), (b) artificial intelligence (AI), or (c) machine learning (ML), Ultra-Wide Band (UWB) processing the audio signal:

one or more of the following, frequency band scoring the audio signal or energy weighting the audio signal:

one or more of the following: (a) noise suppression, (b) noise cancellation of in-band noise, or (e) second order IIR filter of the audio signal.

8. The Claim of claim 7 where a known and unwanted noise source is excluded from the DOA determination.

* * * * *